ized Apr. 18, 1972

United States Patent Office 3,657,221
Patented Apr. 18, 1972

---

3,657,221
PROCESS FOR PREPARING 9b-SUBSTITUTED-1 - SULFONYL - 1,2,3,9b - TETRAHYDRO-5H-IMIDAZO[2,1-a]ISOINDOL-5-ONES
Theodore S. Sulkowski, Wayne, and Scott J. Childress, Philadelphia, Pa., assignors to American Home Products Corporation, New York, N.Y.
No Drawing. Filed Feb. 19, 1969, Ser. No. 800,754
Int. Cl. C07d 49/30
U.S. Cl. 260—309.7                                   6 Claims

ABSTRACT OF THE DISCLOSURE

This invention is concerned with a process for the preparation of 9b-substituted-1-sulfonyl-1,2,3,-9b-tetrahydro - 5H - imidazo[2,1-a]isodinol - 5 - ones which are useful intermediates in the preparation of dihydroimidazoisoindolols which are pharmacologically active as antidepressants and anorexiants.

---

This invention relates to a new and novel process for the preparation of 9b-substituted-1-sulfonyl-1,2,3,9b-tetrahydro-5H-imidazo[2,1-a]isoindol-5-ones. In particular, it concerns the process of condensing an o-ketoacid with a monosulfonylethylenediamine to afford the compounds of this invention which are useful intermediates in the preparation of dihydroimidazoisoindolols which are pharmacodynamically efficacious as anti-depressants and anorexiants.

The new and novel process of this invention is exemplified by the following reaction scheme:

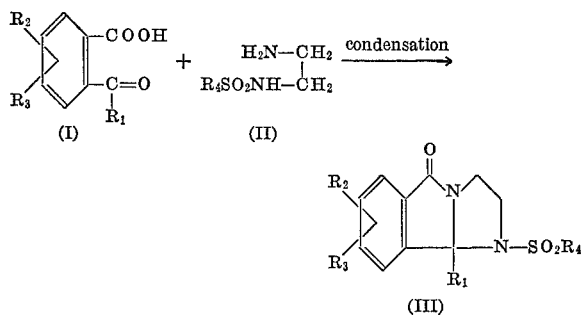

wherein $R_1$ is selected from the group consisting of phenyl, monohalophenyl, dihalophenyl, mono(lower)alkylphenyl, di(lower)alkylphenyl, trifluoromethylphenyl, mono(lower)alkoxyphenyl, di(lower)alkoxyphenyl, thienyl, pyridyl, furyl and tetrahydro-2-naphthyl; $R_2$ is selected from the group consisting of hydrogen, halogen, amino, lower alkylamino, lower alkyl and lower alkoxy; $R_3$ is hydrogen when $R_2$ and $R_3$ are dissimilar and when $R_2$ and $R_3$ are the same they are both selected from the group consisting of hydrogen, halogen, lower alkyl and lower alkoxy; and $R_4$ is selected from the group consisting of lower alkyl, phenyl, monohalophenyl, dihalophenyl, mono(lower)alkylphenyl, di(lower)alkylphenyl and lower alkoxyphenyl. As employed herein the terms "lower alkyl," "lower alkoxy" and the like are meant to include both branched and straight chain moieties containing from one to about six carbon atoms.

The condensation reaction is effected by contacting an appropriate o-ketoacid (I) with a monosulfonylethylenediamine (II) at a temperature range of about 180° C. to about 225° C. for a period of about one-half to about one hour. When the reaction is complete, the resulting 9b-substituted -1-sulfonyl - 1,2,3,9b - tetrahydro - 5H-imidazo[2,1-a]isoindol-5-one (III) is separated by standard recovery procedures. For example, the resulting melt is dissolved in a suitable solvent e.g. an alkanol, treated with charcoal and filtered to obtain the product (III).

The 9b - substituted - 1 - sulfonyl - 1,2,3,9b - tetrahydro-5H-imidazo[2,1-a]isoindol-5-ones (III) which are prepared by the new and novel process of the present invention are useful intermediates in the preparation of dihydroimidazoisoindolols which are described and claimed in copending United States patent application, Ser. No. 757,792, entitled "Tetrahydropyrimidinyl Phenyl Carbonyl Acid Addition Salts, Imidazolinyl Phenyl Carbonyl Compound Acid Addition Salts and Related Compounds," filed Sept. 5, 1968 by Theodore S. Sulkowski. Therein the 9b - substituted - 1 - sulfonyl - 1,2,3,9b - tetrahydro-5H-imidazo[2,1-a]isoindol-5-ones, as prepared by the process of this invention, are hydrolyzed and rearranged by admixture with from about 80 to about 100 percent sulfuric acid to afford an imidazolinyl phenyl carbonyl compound of the following formula:

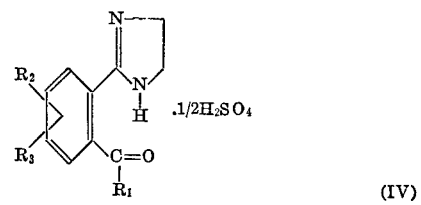

wherein $R_1$, $R_2$ and $R_3$ are defined as above, which may be recovered by conventional means. Alternatively, the rection mixture is neutralized by the addition of a base and the resulting precipitate recrystallized from an appropriate organic solvent, such as, lower alkanol, dioxan, dimethylformamide and dimethylacetamide to afford an appropriate dihydroimidazoisoindolol of the following formula:

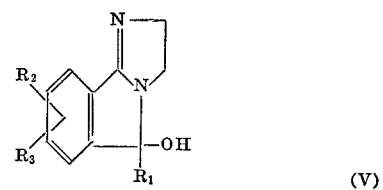

wherein $R_1$, $R_2$ and $R_3$ are defined as above. In the pharmacological evaluation of the anti-depressant property of these dihydroimidazoisoindolols, the in vivo activity is evaluated by the procedure described by Rubin et al. in J.P.E.T. 120, 125 (1957). When tested by this procedure, these compounds (V) demonstrate useful anti-depressant activity, e.g. having mood elevating properties as psychic energizers, when they are administered orally to mice in a dosage range from about 1 to about 5 mg./kilo of animal body weight. Further, the in vivo anorexiant activity of these dihydroimidazoisoindolols (V), e.g. appetite supressant effects, is evaluated by the following procedure:

Male Charles River rats between 120 and 140 grams are trained to drink sweetened condensed milk from a graduated drinking tube. After a short learning period the animals are placed on a routine of water ad lib for twenty-four hours, standard laboratory chow for twenty-two hours and sweetened condensed milk for two hours. The volume of milk consumed is measured at one-half hour as well as two hours and the animals are weighed daily. This schedule is maintained five days a week over a period of several months. Trials are run on the same day each week and changes in milk consumed and twenty-four hour weight changes are compared to the average of the two days before the test compound is administered. Animals are tested as groups of six and one group is given saline each week to serve as controls. The test compounds are usually administered intraperitoneally in saline and/or orally in water.

The dihydroimidazoisoindolols (V) prepared by this invention in the above test procedure when administered orally to rats at a dose of 10 mg./kg. induce a decrease in food consumption of about forty percent in the first half hour and about twenty percent in two hours with a concurrent total average weight loss of about one-half a gram/animal in twenty-four hours. When administered intraperitoneally at a dose of 10 mg./kg., these dihydroimidazoisoindolols (V) induce a decrease in food consumption of about eighty percent in the first half hour and sixty-five percent in two hours with a concurrent total twenty-four hour average weight loss of about seven and a half grams/animal.

When the dihydroimidazoisoindolols (V) are employed as anti-depressant and anorexiant agents, they may be administered to mammals, e.g. mice, rats, rabbits, dogs, cats, monkeys, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of these dihydroimidazoisoindolols (V) will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

A mixture of 10 g. of o-benzoylbenzoic acid 12 g. of N-monotosylethylenediamine is heated at 180–210° C. for twenty-five minutes. The viscous melt is cooled and dissolved in ethanol. The solution is treated with charcoal and filtered. On standing there is obtained 1,2,3,9b-tetrahydro - 9b - phenyl - 1 - (p-tolylsulfonyl)-5$H$-imidazo[2,1-a]-isoindol-5-one, M.P. 158–160° C.

In a similar manner, reacting an appropriate o-benzoylbenzoic acid with N-monotosyl-ethylenediamine, there is obtained:

9b-(3,4-diiodophenyl)-1,2,3,9b-tetrahydro-1-(p-tolylsulfonyl)-5$H$-imidazo[2,1-a]isoindol-5-one;
9b-(3,4-diethoxyphenyl)-1,2,3,9b-tetrahydro-1-(p-tolylsulfonyl)-5$H$-imidazo[2,1-a]isoindol-5-one;
9b-(4-hexylphenyl)-1,2,3,9b-tetrahydro-1-(p-tolylsulfonyl)-5$H$-imidazo[2,1-a]isoindol-5-one;
7-amino-9b-(p-fluorophenyl)-1,2,3,9b-tetrahydro-1-(p-tolylsulfonyl)-5$H$-imidazo[2,1-a]isoindol-5-one; and
7-chloro-9b-(4-ethylphenyl)-1,2,3,9b-tetrahydro-1-(p-tolylsulfonyl)-5$H$-imidazo[2,1-a]isoindol-5-one.

EXAMPLE II

A mixture of 7.8 g. of o-(p-chlorobenzoyl)benzoic acid and 7 g. of N-monotosylethylenediamine is heated in an oil bath at 220–225° C. for one hour. After cooling, the melt is dissolved in ethanol, treated with charcoal and filtered. On standing at room temperature, there is obtained 9b-(p-chlorophenyl) - 1,2,3,9b - tetrahydro-1-(p-tolylsulfonyl)-5$H$-imidazo[2,1-a]isoindol - 5-one, M.P. 169–171° C.

*Analysis.*—Calc'd for $C_{23}H_{19}ClN_2O_3S$ (percent): C, 62.93; H, 4.34; N, 6.38; Cl, 8.08; S, 7.30. Found (percent): C, 63.24; H, 4.61; N, 6.15; Cl, 7.9; S, 7.3.

EXAMPLE III

A mixture of 6 g. of o-(p-bromobenzoyl)benzoic acid and 5 g. of N-monotosylethylenediamine is heated in an oil bath at 215–220° C. for one-half hour. The melt is cooled and dissolved in 25 ml. of ethanol. After standing one hour, the solution is separated from a small amount of gummy precipitate. The solution is cooled in an ice bath and the precipitated solid is separated. On recrystallization from ethanol there is obtained 9b-(p-bromophenyl) - 1,2,3,9b - tetrahydro-1 - (p-tolylsulfonyl)-5$H$-imidazo[2,1-a]isoindol-5-one, M.P. 163–5° C.

EXAMPLE IV

A mixture of 3.2 g. of o-(3-bromo-p-toluoyl)benzoic acid and 2.5 g. of N-monotosylethylenediamine is heated in an oil bath of 220–3° C. for forty-five minutes. The melt is cooled, dissolved in ethanol and treated with charcoal. The soltuion is evaporated to a volume of 20 ml. and is then cooled in an ice bath. The solid is separated to obtain 9b-(3-bromo-p-tolyl)-1,2,3,9b-tetrahydro-1-(p-tolylsulfonyl)-5$H$ - imidazo[2,1-a]isoindol - 5-one, M.P. 198–201° C.

*Analysis.*—Calc'd for $C_{24}H_{21}BrN_2O_3S$ (percent): C, 57.95; H, 4.26; N, 5.64; Br, 16.08; S, 6.45. Found (percent): C, 58.21; H, 4.34; N, 5.62; Br, 16.30; S, 6.63.

Similarly, 1,2,3,9b-tetrahydro - 7-methyl-9b-phenyl-1-(p-tolylsulfonyl) - 5$H$-imidazo[2,1-a]isoindol-5-one; and 1,2,3,9b-tetrahydro-9b - phenyl-9 - propyl-1-(p-tolylsulfonyl)-5$H$-imidazo[2,1-a]isoindol-5-one are prepared.

EXAMPLE V

A mixture of 4.8 g. of o-(p-toluoyl)benzoic acid and 5 g. of N-monotosylethylenediamine is heated in an oil bath at 220–5° C. for one hour. The melt is cooled and dissolved in 20 ml. of ethanol. After standing overnight the solution is decanted from a small amount of gummy precipitate. The solution is cooled in an ice bath and the solid is separated. On recrystallization from ethanol there is obtained 9b-(p-tolyl)-1,2,3,9b-tetrahydro-1-(p-tolylsulfonyl) - 5$H$-imidazo[2,1-a]isoindol-5-one, M.P. 148–150° C.

*Analysis.*—Calc'd for $C_{24}H_{22}N_2SO_3$ (percent): C, 68.87; H, 5.30; N, 6.79; S, 7.66. Found (percent): C, 69.04; H, 5.38; N, 6.58.

Repeating the above procedure, the following compounds are prepared:

9b-(3,4-dichlorophenyl)-1,2,3,9b-tetrahydro-1-(p-tolylsulfonyl)-5$H$-imidazo[2,1-a]isoindol-5-one;
9b-(p-fluorophenyl)-1,2,3,9b-tetrahydro-1-(p-tolylsulfonyl)-5$H$-imidazo[2,1-a]isoindol-5-one;

EXAMPLE VI

When the procedure of Examples I–V is repeated to react an appropriate o-ketoacid and a monosulfonylethylenediamine, the following 9b-substituted-1-sulfonyl-1,2,3,9b-tetrahydro-5H-imidazo[2,1-a]isoindol-5-ones are produced:

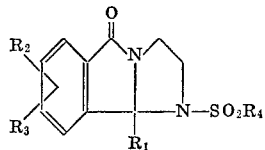

where $R_1$, $R_2$, $R_3$ and $R_4$ are defined.

| $R_1$ | $R_2$ | $R_3$ | $R_4$ |
| --- | --- | --- | --- |
| p-Iodophenyl | 7-bromo | Hydrogen | Ethyl. |
| 3,4-dimethylphenyl | 8-methoxy | do | Phenyl. |
| p-Methoxyphenyl | 7-chloro | 8-chloro | p-Chlorophenyl. |
| Trifluoromethylphenyl | 7-methylamino | Hydrogen | Phenyl. |
| 2,5-dibromophenyl | 7-methyl | 8-methyl | p-Bromophenyl. |
| 3,4-dimethoxyphenyl | 6-ethoxy | Hydrogen | 4-ethylphenyl. |
| Thienyl | 7-methoxy | 8-methoxy | 3,4-dimethylphenyl. |
| p-Propoxyphenyl | 9-iodo | Hydrogen | Phenyl. |
| Pyridyl | 7-fluoro | 8-fluoro | 2,5-dichlorophenyl. |
| 2,5-dipropoxyphenyl | Hydrogen | Hydrogen | Pentyl. |
| Furyl | 7-ethyl | do | 3,4-dibromophenyl. |
| 3,4-diethylphenyl | 8-propylamino | do | p-Iodophenyl. |
| Tetrahydro-2-naphthyl | 7-ethyl | 9-ethyl | p-Methoxyphenyl. |
| Phenyl | Hydrogen | Hydrogen | p-Iodophenyl. |
| Do | 8-ethyl | do | 3,4-difluorophenyl. |
| 2,5-dibutylphenyl | Hydrogen | do | p-Ethoxyphenyl. |
| Phenyl | do | do | 3,4-diethylphenyl. |
| p-Chlorophenyl | 7-ethoxy | do | p-fluorophenyl. |
| Phenyl | Hydrogen | do | p-Ethoxyphenyl. |

What is claimed is:

1. A process for the preparation of a compound having the formula:

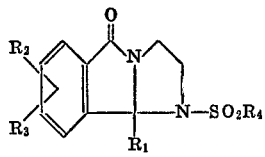

wherein $R_1$ is selected from the group consisting of phenyl, monohalophenyl, dihalophenyl, mono(lower)alkylphenyl, di(lower)alkylphenyl, trifluoromethylphenyl, mono(lower)-alkoxyphenyl, di(lower)alkoxyphenyl, thienyl, pyridyl, furyl and tetrahydro-2-naphthyl; $R_2$ is selected from the group consisting of hydrogen, halogen, amino, lower alkylamino, lower alkyl and lower alkoxy; $R_3$ is hydrogen when $R_2$ and $R_3$ are dissimilar and when $R_2$ and $R_3$ are the same they are both selected from the group consisting of hydrogen, halogen, lower alkyl and lower alkoxy; and $R_4$ is selected from the group consisting of lower alkyl, phenyl, monohalophenyl, dihalophenyl, mono(lower)alkylphenyl, di(lower)-alkylphenyl and lower alkoxyphenyl which comprises contacting an o-ketoacid of the formula:

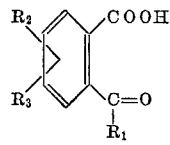

wherein $R_1$, $R_2$ and $R_3$ are defined as above, with an approximately molar equivalent amount of a monosulfonylethylenediamine of the formula:

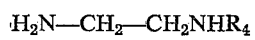

$$H_2N-CH_2-CH_2NHR_4$$

wherein $R_4$ is defined as above, at a temperature range of about 180° C. to about 225° C. for a period of about one-half to about one hour in the absence of a solvent.

2. A process as described in claim 1 wherein the monosulfonylethylenediamine is N-monotosylethylenediamine.

3. A process as described in claim 1 to prepare 9b-phenyl - 1,2,3,9b - tetrahydro - 1 - (p-tolylsulfonyl)-5H-imidazo-[2,1-a]isoindol-5-one wherein the monosulfonylethylenediamine is N-monotosylethylenediamine and the o-ketoacid is o-benzoylbenzoic acid.

4. A process as described in claim 1 to prepare 9b-(p-chlorophenyl) - 1,2,3,9b - tetrahydro - 1 - (p-tolylsulfonyl)-5H-imidazo[2,1-a]isoindol-5-one wherein the monosulfonylethylenediamine is N-monotosylethylenediamine and the o-ketoacid is o-(p-chlorobenzoyl)benzoic acid.

5. A process as described in claim 1 to prepare 9b-(p-bromophenyl) - 1,2,3,9b - tetrahydro-1-(p-tolylsulfonyl)-5H-imidazo[2,1-a]isoindol-5-one wherein the monosulfonylethylenediamine is N-monotosylethylenediamine and the o-ketoacid is o-(p-bromobenzoyl)benzoic acid.

6. A process as described in claim 1 to prepare 9b-(3-bromo-p-tolyl) - 1,2,3,9b - tetrahydro-1-(p-tolylsulfonyl)-5H-imidazo[2,1-a]isoindol - 5 - one wherein the monosulfonylethylenediamine is N-monotosylethylenediamine and the o-ketoacid is o-(3-bromo-p-toluoyl)benzoic acid.

References Cited

UNITED STATES PATENTS 3,334,113  8/1967  Houlihan _____ 260—309.7

FOREIGN PATENTS 659,530  8/1965  Belgium _____ 260—310 R
6613264  3/1967  Netherlands _____ 260—310 R

OTHER REFERENCES

Sulkowski et al.: "J. Org. Chem.," vol. 32, pp. 2180–2184 (1967).

HENRY R. JILES, Primary Examiner

R. T. BOND, Assistant Examiner

U.S. Cl. X.R.

260—294.8, 309.6; 424—273